Jan. 27, 1942. F. B. CARPENTER, JR., ET AL 2,271,361

PROCESS OF PRODUCTION OF ANHYDROUS MONOCALCIUM PHOSPHATE

Filed April 25, 1939

Inventors
F. B. Carpenter, Jr.
W. K. Enos
By Mason Fenwick & Lawrence
Attorneys

Patented Jan. 27, 1942

2,271,361

UNITED STATES PATENT OFFICE 2,271,361

PROCESS OF PRODUCTION OF ANHYDROUS MONOCALCIUM PHOSPHATE

Frank B. Carpenter, Jr., and Wilbur K. Enos, Charleston, S. C., assignors to Virginia-Carolina Chemical Corporation, Richmond, Va., a corporation of Virginia Application April 25, 1939, Serial No. 269,986

3 Claims. (Cl. 23—109)

This invention pertains to an improved process for manufacturing monocalcium phosphate and also for improving the physical and chemical properties of commercial forms of monocalcium phosphate.

Monocalcium phosphate is the primary salt of orthophosphoric acid. It is known in two modifications, the anhydrous salt $Ca(H_2PO_4)_2$ which exists in the triclinic crystal system, and the monohydrate $Ca(H_2PO_4)_2 H_2O$ which crystallizes in the rhombic system. The pure products are hygroscopic in nature and also are easily hydrolysed into the more stable dicalcium salt and free phosphoric acid. The pure crystal products are cohesive in nature and not free flowing. In commercial practice it is common to stabilize monocalcium phosphate, herein designated as MCP, by adding calcium compound in excess of that required for the mono-salt, so that some di- and tricalcium phosphate are formed as in U. S. Patent 1,913,796. It is also common practice to coat the particles with basic tricalcium phosphate as shown in 25 142-7, (1933) Moss, Schilb & Warning Ind. Eng. Chem., magnesium compounds, as in U. S. Patents 1,913,796 and 1,785,473 to harden the crystals, lime, as in U. S. Patent 2,018,449 or 2,135,475 and other substances to eliminate traces of free acid, and to make the resultant products more free flowing. In coating the particles these materials retard the rate of reaction. This principle of retarding the rate of reaction has also led to the development of inert coatings such as casein, oils, and similar materials.

A principal use of commercial MCP is as an acid leavening ingredient. In this use the product reacts with bicarbonate of soda and releases carbon dioxide as leavening gas. The amount of bicarbonate of soda that is neutralized by the monocalcium phosphate is known as the neutralizing value of the product. The stability of commercial MCP and the rate of reaction are points of prime importance.

An object of the present invention is to produce in a single operation and simple manner a stable monocalcium phosphate free from water of crystallization and containing no free acid. A particular object is to control the particle size. An additional object is to obtain a monocalcium phosphate with higher neutralizing value than monocalcium phosphate monohydrate, and stabilized and non-hygroscopic. A further object is to produce MCP in anhydrous form, preferably as discrete crystals, and to control the general composition of these particles in commercial manufacture. These and other objects will appear hereinafter more fully in an illustrative description of this invention taken with the accompanying drawing and more fully pointed out in the appended claims.

According to the present invention, a suitable process to produce anhydrous MCP in a stable and fluent form comprises mixing an alkali earth base, particularly calcium oxide or hydroxide, with phosphoric acid in certain amounts, at certain temperatures and in controlled manner, as will be more fully pointed out hereinafter. Preferably, such control is employed as maintains the magma during reaction within certain definite temperature ranges and certain compositions until a fluent powder results. The production is accomplished in a single mixing operation.

Figure 1:
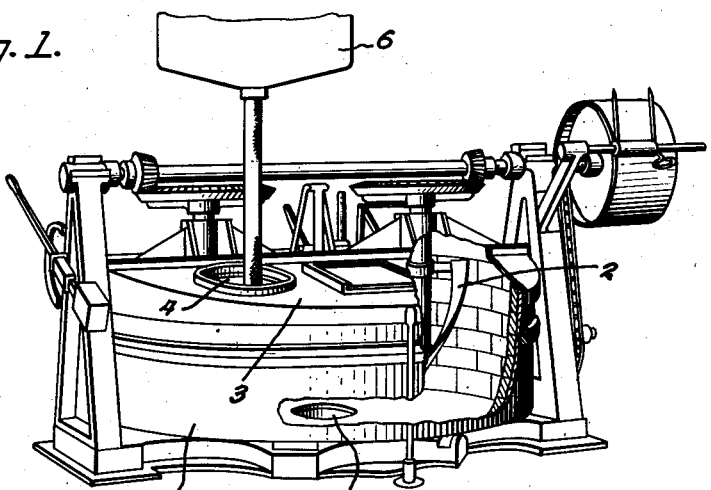
Figure 1 illustrates in diagrammatic form apparatus that is capable for use in the process of this invention.

In the drawing, which refers to specific forms of this invention without limitation, Figure 1 depicts the mixer used for this purpose. A shell 1 is lined with acidproof brick and is mounted for rotation about a vertical axis. The equipment is the typical chemical plastic mixer employed in the industry in many modifications. Within the shell there are two agitators with mixing blades 2 revolving relatively to the shell. A plow 3 throws the material against the agitators. A cover 4 admits the solid material and liquid reagent; and through the cover is a vent 5. The material is discharged through a central lower outlet 6 to which the material is thrown by the plow. Located conveniently near the mixing pan is an acid boot with provisions for heating and measuring the acid to be added to the shell. This boot and all piping therefrom may be rubber lined to prevent contamination of acid by corrosion.

In illustrative and preferred practice under the process of this invention, though this invention is not necessarily limited to these illustrative details, a suitable amount of powdered lime is heated with concentrated phosphoric acid at a temperature below about 300° F., and subsequently while heating gradually to 300° to 400° F. agitating and gradually adding lime until the material contains no free acid and is powdery and fluent. In general, the crystals form initially in a medium more acid than pH 3.8, and the medium gradually is brought to a condition less acid than pH 4.3. Preferably, calcium oxide in pure condition where a food product is to be obtained is first introduced into the mixer. In lieu of calcium oxide, calcium hydroxide, di- or tricalcium phosphate, or calcium carbonate may be employed. The lime may well be of a fineness of 100 mesh.

For example, 284 pounds of lime are placed in the mixer and this mass brought approximately under the acid inlet. This step is not essential to the process, but has been found to secure an effective distribution of the solid in the liquid during the early stages of the ensuing chemical reaction. Then 1872 pounds of phosphoric acid, about 83% $H_3PO_4$, heated to a temperature of 120° F. is added. The reaction is exothermic and proceeds with considerable evolution of heat which is utilized to control the reactions. Initially the reaction is slow until the mass approaches the boiling point of the mixture. It then proceeds rapidly with evolution of water vapor. Some loss of lime may occur with the vapors. The magma is first of a pasty consistency, then it becomes very fluid, and with the evolution of water vapor again becomes pasty. In composition the mass is initially unreacted lime, with calcium phosphate monohydrate crystals and an excess of phosphoric acid; and then as the temperature rises above the critical points, later discussed, the mass becomes a mixture comprising the anhydrous MCP crystals and phosphoric acid. More lime, 142 pounds, are now added gradually while the mixer revolves. This is the critical stage of the formation and growth of the anhydrous MCP crystals. The mix now contains 90-98%, preferably about 96%, of the theoretical amount of CaO for the mono salt of orthophosphoric acid. The temperature is held preferably within the range 300° and 340° F. by control of the rate of addition of the lime, and the speed of the mixer. The temperature in the latter part of this stage may be permitted to attain 375° F., but temperatures of approximately 400° F. and above may result in some formation of calcium acid pyrophosphate or of the polyphosphates. At lower temperatures than in the desired range, there is growth of monohydrate crystals, which are not redissolved. The total amount of the lime utilized varies with the loss by entrainment with the steam. The product in the pan now consists of essentially pure MCP anhydrous crystals with some free phosphoric acid. Samples of the product are taken at this point to determine the amount of free phosphoric acid remaining in the product, and also the neutralizing value is tested to indicate the presence either of the monohydrate or of the pyro- and other salts. During this stage about 85% of the final amount of lime has been utilized and the weight ratio of $CaO:P_2O_5$ is about 0.38.

To eliminate color in the MCP due to traces of organic matter in phosphoric acid, sodium chlorate is added to the acid and to the mixing operation above described. One of the resulting products in hot phosphoric acid is sodium phosphate. We have found that if the $Na_2O$ content of the phosphoric acid is held within the range of 0.5-1.5%, as for example 0.85%, the anhydrous crystal MCP obtained by the method above can be more easily stabilized. With the use of pure phosphoric acids where there is less need for sodium chlorate, then soda may be added as the hydroxide, the carbonate, or the bicarbonate. Potassium chlorate, potassium hydrate, or potassium carbonate can also be used in like amounts for the same purpose. These alkali metals are held on the surfaces on the anhydrous MCP crystals in a liquid phase at the temperatures employed.

The mixing is continued with the addition of lime as above described; with further mixing the product becomes a very fluent crystalline mass. Additional lime of a fineness of all minus 100 mesh and preferably of about 90% minus 150 mesh, is now added. Thus added it reacts with traces of phosphoric acid still remaining, and stabilizes the resultant product. The exact amount to be added varies with the results of the control analysis. In the illustrative mix, 90 pounds have been found to be the proper quantity. This is added very slowly while the mixer is continued at speed of approximately 6 R. P. M., 8 foot diameter mixer used. Temperature control is essential as above set forth, and the temperature is held preferably at 375° F. The purpose is to obtain the maximum coverage in the least time, at a temperature not exceeding about 375° F.; with agitation at the maximum rate available. With the addition of this lime there is an initial rise of temperature, and then the mass begins to cool. When the temperature has fallen to approximately 300° F., or lower, approximately 15 pounds of powdered basic tricalcium phosphate are added to improve the mechanical condition of the crystals. The mass is now dry and exceedingly fluent, and when cooled is easily handled.

The resultant product of the process consists of triclinic anhydrous MCP crystals, stabilized and made free flowing by a surface coating of essentially calcium oxide and calcium phosphate bound to the crystal apparently by the phosphate of the alkali metal. The crystals are translucent. However, under high magnification the basic stabilizers may be seen adhering to the crystal surfaces. The crystals produced are substantially from 20 to 100 microns in length and 5 to 15 microns in width. The mechanical condition is such that the angle of repose of the material is approximately 36°. The composition of the material is essentially that of anhydrous MCP crystals modified by the alkaline stabilizers employed. Its neutralizing value is about 88. The material in a strength of 0.5% solution exhibits an initial pH of 4.1 which on standing increases to 4.8. The $CaO:P_2O_5$ weight ratio in theoretical MCP is 0.39, in the usual commercial MCP's is from 0.40 to 0.44 and in this product may be 0.42 to 0.46.

In general, it is recognized that the text "A Comprehensive Treatise on Inorganic and Theoretical Chemistry" by J. W. Mellor, volume III, 1923, page 887 describes anhydrous calcium dihydrophosphate and page 865 cites work by H. Bassett, Zeit, Anorg. Chem. vol. 59, 1, 1908. Some description of the system $P_2O_5$—$CaO$—$H_2O$ is given by N. A. Clark in Jour. Physical Chemistry 35 1232 (1931).

Figure 3:
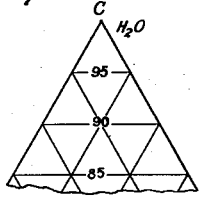
Figure 3 represents a diagram of various physical-chemical phase conditions involved during certain operations of the present process.
Figure 3:
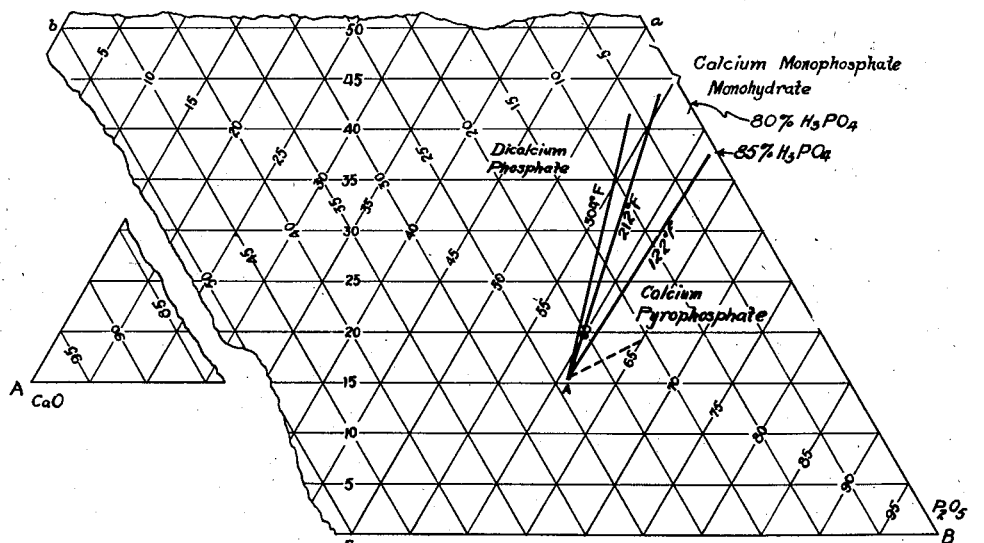
Figure 2:
Figure 2 illustrates somewhat conventionally crystalline particles of the anhydrous MCP which it is the object of this process to produce.

In operating the process of this invention, it is convenient to describe suitable conditions by reference to Figure 3 which is part of a so-called triangular diagram of the system $P_2O_5$ $CaO$—$H_2O$. Thus, Figure 3 shows that at different temperatures, for example, from 122° F. to 304° F., there are series of compositions represented by lines of demarcation, which may be varied. For example, decrease of $P_2O_5$ yields calcium monophosphate monohydrate or increase of $P_2O_5$ and increase of CaO yield dicalcium phosphate. In the process of the present invention it is desirable to operate, generally speaking, in the area of composition on that side of the compositional lines lying toward the $P_2O_5$ apex.

Thus, for example, as starting reagents in the process of this invention it is desirable to select phosphoric acid at a point indicated by the arrow on Figure 3, which is approximately at 85% $H_3PO_4$ or a weight ratio of $H_2O$-$P_2O_5$ of 0.626. In commercial practice, it is possible to start with less concentrated phosphoric acid even as low as about 77%. Lower than this, the initial steps of the process would consist in evaporation of water before addition of any appreciable amount of calcium base. At about 80% phosphoric acid or preferably above 80%, lime is added so that the early compositions may be represented in general by progress on the diagram of Figure 3 from the $H_2O$—$P_2O_5$ base toward the CaO apex to areas limited by the appropriate compositional lines at the temperatures indicated. In proceeding with the process of the present invention, the operating temperatures, as have been stated, lie above 300° F. and are not shown on the diagram of Figure 3 inasmuch as their representation would entail the use of a solid diagram of more complicated nature than is feasible or necessary in the present description. Figure 3, serves, however, to illustrate initial conditions which should obtain at the outset of the practice of this process. However, in the practice of this process the addition of lime is restricted so as not to exceed at any time during the stage of formation of the anhydrous monocalcium phosphate the composition represented on Figure 3 at the point A, which is approximately 24% CaO. This is the stage during which the magma is liquid or pasty. Subsequently, during the stage of final growth of crystals and during the stage of stabilizing treatment while the material is becoming more dry and powdery the percentage of calcium oxide may exceed 24%.

It will be recognized that the practice of this invention is not limited to any theory nor to illustrative details shown here and that the facts presented in Figure 3 permit some latitude of initial choice of operations.

While according to the provisions of the patent statutes we have described the general principles of this invention and illustrated them with reference to procedures that are at present preferred, it is evident that now those skilled in the art will be able to select variations in conditions and procedure within the scope of the appended claims.

What we claim is:

1. A process of producing monocalcium phosphate in the form of small discrete crystals, comprising heating phosphoric acid of at least 75% $H_3PO_4$ while adding gradually an amount of lime less than about 65% of that necessary to convert the $H_3PO_4$ to monocalcium phosphate until the mass thickens with formation of hydrated crystals of monocalcium phosphate, and then heating to bring the mass into a more liquid and definitely boiling condition at about 300° F., with conversion of the hydrated monocalcium phosphate to the anhydrous crystalline form, and then eliminating liquid from the mass by heating and adding lime to attain a weight ratio of $CaO:P_2O_5$ of about 0.39 to complete the formation of anhydrous monocalcium phosphate, free from excess phosphoric acid, as a dry product.

2. A process of producing monocalcium phosphate in the form of small discrete crystals, comprising heating phosphoric acid of at least 75% $H_3PO_4$ while adding gradually an amount of lime less than about 65% of that necessary to convert the $H_3PO_4$ to monocalcium phosphate until the mass thickens with formation of hydrated crystals of monocalcium phosphate, and then heating to bring the mass into a more liquid and definitely boiling condition at about 300° F., with conversion of the hydrated monocalcium phosphate to the anhydrous crystalline form, and then eliminating liquid from the mass by heating and by gradual addition of lime to attain a weight ratio of $CaO:P_2O_5$ of about 0.39, and then, maintaining a temperature of substantially 375° F., finally eliminating all free phosphoric acid by adding lime to a weight ratio of about 0.42, to obtain a fluent mass of anhydrous crystals as a dry product.

3. A process of preparing stabilized monocalcium phosphate free from water of crystallization comprising heating phosphoric acid of at least 77% $H_3PO_4$ from a temperature of about 120° F. with calcium base in an initial amount less than 65% of the CaO equivalent to monocalcium phosphate, raising the temperature gradually with formation of hydrated monocalcium phosphate until the mixture boils, maintaining a freely boiling liquid condition at substantially 300° F. until the hydrated monocalcium phosphate is converted to the anhydrous crystalline form, and then gradually adding lime and agitating the mixture at about 320° F. to 340° F. until the mixture is powdery, then adding finely divided lime until the weight ratio of $CaO:P_2O_5$ is about 0.42 and the product is powdery and fluent.

FRANK B. CARPENTER, Jr.
WILBUR K. ENOS.